United States Patent [19]
Mizuki et al.

[11] Patent Number: 5,637,385
[45] Date of Patent: Jun. 10, 1997

[54] HIGH-STRENGTH ULTRA-FINE FIBER CONSTRUCTION, METHOD FOR PRODUCING THE SAME AND HIGH-STRENGTH CONJUGATE FIBER

[75] Inventors: Tatsuro Mizuki; Akio Tahara, both of Okazaki; Hiroshi Takahashi, Mishima, all of Japan

[73] Assignee: Toray Industries, Inc., Japan

[21] Appl. No.: 714,514

[22] Filed: Sep. 17, 1996

Related U.S. Application Data

[63] Continuation of Ser. No. 384,311, Feb. 1, 1995, abandoned.

[30] Foreign Application Priority Data

Feb. 7, 1994 [JP] Japan ..................... 6-013832

[51] Int. Cl.$^6$ ............... D03D 3/00; D02G 3/00; B60R 21/16
[52] U.S. Cl. ............ 442/361; 428/373; 428/370; 428/374; 280/728.1; 57/243; 442/363
[58] Field of Search ............... 428/224, 221, 428/370, 373, 374; 280/728.1; 57/243

[56] References Cited

U.S. PATENT DOCUMENTS

| | | | |
|---|---|---|---|
| 3,716,614 | 2/1973 | Okamoto et al. | 264/171 |
| 3,865,678 | 2/1975 | Okamoto et al. | 161/67 |
| 4,051,287 | 9/1977 | Hayashi et al. | 428/373 |
| 4,251,587 | 2/1981 | Mimura et al. | 428/233 |
| 4,381,335 | 4/1983 | Okamoto | 428/373 |
| 4,921,735 | 5/1990 | Bloch | 428/252 |
| 4,966,808 | 10/1990 | Kawano | 428/373 |
| 4,977,016 | 12/1990 | Thornton et al. | 428/225 |
| 5,124,194 | 6/1992 | Kawano | 428/374 |
| 5,204,041 | 4/1993 | Tashiro et al. | 428/288 |
| 5,215,795 | 6/1993 | Matsumoto et al. | 280/743 |
| 5,290,626 | 3/1994 | Nishio et al. | 428/373 |
| B1 3,865,678 | 10/1982 | Okamoto et al. | 428/369 |

FOREIGN PATENT DOCUMENTS

| | | |
|---|---|---|
| 47-2485 | 1/1972 | Japan . |
| 56-118961 | 9/1981 | Japan . |
| 57-49653 | 10/1982 | Japan . |
| 63-42031 | 8/1988 | Japan . |
| 64-41438 | 2/1989 | Japan . |
| 1-122752 | 5/1989 | Japan . |
| 3-243442 | 10/1991 | Japan . |
| 4-2835 | 1/1992 | Japan . |
| 4-209825 | 7/1992 | Japan . |
| 4-361659 | 12/1992 | Japan . |
| 5-106117 | 4/1993 | Japan . |
| 5-213131 | 8/1993 | Japan . |
| 6-128836 | 5/1994 | Japan . |
| 6-306728 | 11/1994 | Japan . |
| 6-341033 | 12/1994 | Japan . |

*Primary Examiner*—Newton Edwards
*Attorney, Agent, or Firm*—Austin R. Miller

[57] ABSTRACT

A high-strength ultra-fine fiber construction including a high-strength multi-filament yarn including ultra-fine filaments of a fineness of a single filament less than 0.8 denier, a tenacity of 6.5 g/d or more, and the elongation at break of the multi-filament yarn being 15% or more. In order to obtain such a fiber construction, islands-in-sea-type or divisional type conjugate spinning is initially carried out to obtain conjugate multi-filament yarns, which is subjected to weaving to produce a fabric, and a island component removing or dividing treatment is finally done in order to obtain the high-strength ultra-fine fiber in the fiber structure.

Ultra-fine fibers of the desired strength together with a particular range of a cover factor provides all the advantages of the ultra-fine fibers. A reduced air permeability, when it is necessary, can be easily obtained. Namely, a desired mechanical property as well as a desired softness are both obtained, while the number of naps and filament breakages are reduced. An air bag as the fiber construction can attain any desired properties such as high mechanical strength, a large degree of softness, a neatness when folded, and a low air permeability.

Furthermore, a method is also disclosed, for producing the fiber construction, which allows melt spinning as well as weaving to be executed while preventing any occurrence of operational difficulties, such as naps and filament breaks.

13 Claims, No Drawings

HIGH-STRENGTH ULTRA-FINE FIBER CONSTRUCTION, METHOD FOR PRODUCING THE SAME AND HIGH-STRENGTH CONJUGATE FIBER

This application is a continuation of application Ser. No. 08/384,311, filed Feb. 1, 1995, now abandoned.

BACKGROUND OF THE INVENTION

1. Field of the Invention

The present invention relates to a fiber construction suitable for various industrial uses. More particularly, the present invention relates to a fiber construction of a high tenacity as well as a high softness, which is capable of being melt spun, as well as woven, without accompanying operational difficulties such as generation of naps or filament breakages. Further, more particularly, the present invention relates to a fiber construction of reduced air permeability, which is practically useful as a basic fabric for an air bag and the like.

2. Description of Related Art

A fiber construction made of synthetic fibers is widely used for various field in materials for industries: such as rubber reinforcing materials for items such as tires, belts such as V-belts or conveyor belts, and hoses; woven or knitted fabrics such as a canvas, tent, tarpaulin, cover sheet, seat belt, and air bag fabrics; fish nets; ropes; and sewing threads.

It has heretofore been known that a thread used for producing the fiber construction for the above items must have a fineness of a single filament of 5 denier or more. Such a limitation of a fineness of the single filament is derived, on one hand, from requirements as to thread performance, such as, obtaining a high-strength of a thread, and reducing the specific surface area to prevent the fiber construction from being degraded at its surface and, on the other hand, from a productivity requirement such as preventing operational difficulties, such as naps and filament breakage, from increasing during a melt spinning process.

However, due to the recent industrial use of a fiber construction in various textile related products, such as canvas, tent, tarpaulin, and air bag fabrics, it has been frequently required that the fiber construction provides a high-strength, reduced weight and increased softness.

In order to meet the above-mentioned requirements in various field of use, various improvements have been attempted including, for example, reducing the total denier of the filaments, or the denier of a single filament, in the fabric, have been proposed.

When an application to a basic fabric for an air bag is considered, a first requirement is that the air bag has a low value of air permeability as well as a high mechanical strength, which allows the bag to be quickly expanded when a shock is generated. Additionally, it is also requested that a driver or a passenger is prevented from being abrasively wounded especially on his or her face when the air bag is inflated, that the air bag is in a compact condition when it is stored, and that any substantial dimensional change does not occur during a prolonged storage in an automobile body.

It is, however, difficult to meet all of the above requirements. For example, when a basic fabric for an air bag is produced so as to cause, among these requirements, the one for reducing the air permeability to be met, the basic fabric becomes too thick, which causes the fabric to be lacking in a compactness in a folded state, on one hand, and the impact force to be increased upon the contact between the air bag and a human body, thereby causing a driver or passenger to be abrasively wounded upon the inflation of the air bag. In short, a construction of the basic fabric for the air bag must be such that a plurality of requirements, which contradict each other, are met.

Various basic fabrics have heretofore proposed for utilization in an air bag. For example, Japanese Un-Examined Patent Publication No. 3-243442 proposes a basic fabric made of nylon yarns with no coating, with a single filament denier of 4 to 7 and with a total denier of 400 to 1,000 (below; non-coated type), as well as a basic fabric of the same construction with a coating of resin such as chloroprene or silicon (below; coated type).

Irrespective of an advantage of a low gas permeability, this type of basic fabric for an air bag is defective in that large value of the total denier of the filaments constructing the yarn as well as a large value of a denier of the single filament make the fabric to be lacking in softness, thereby causing its compactness to be worsened, on one hand, and an impact force to be increased upon contact of the inflated air bag with a human body, on the other hand. Furthermore, as far as the coated basic fabric is concerned, a process for producing the same is complicated and it is difficult to obtain a uniform thickness of the coating of the resin on the surface of the basic fabric.

In order to obviate the above-mentioned drawbacks, various improvements have been proposed. For example, Japanese Un-Examined Patent Publication No. 1-104848 proposes to provide a basic fabric made of multi-filament yarn with a reduced value of the total denier, in order to reduce the thickness of the fabric, thereby making the obtained basic fabric to be more soft, on one hand, and the fabric to be more compact in a folded state, on the other hand.

However, only a reduction in the value of the total denier causes the gas permeability to be excessively increased, which causes the coating by the resin to be inevitable, which makes the compactness of the basic fabric to be worsened. In order to obtain both of the low gas permeability and an improved compactness, a method is conceivable that the total denier is reduced, while increasing the density of woven fabric. However, the usual range of the denier of the single filament between 4 and 7 (d) provides a limitation in an improvement in the softness of the fabric by the reduction of the value of the total denier, which makes it difficult to improve the softness to a desired value.

Furthermore, in order to obtain a neatly foldable structure in the coated type product, the Japanese Unexamined Patent Publication No. 64-41438 has proposed a basic fabric for an air bag, wherein it is produced from a multi-filament yarn of a tenacity of 8.5 g/d or more and of a denier of a single filament of 3 (d) or less. Furthermore, the Japanese Patent Publication No. 4-214437 proposes a non-coated type of basic fabric for an air bag made of polyethylene terephthalate multi-filament yarns with a denier of a single filament of 4 dtex or less and of a total denier in a range between 250 to 400 dtex.

However, in these prior art, as described in the disclosed embodiment, the reduction of a value of the denier of a single filament is, at best, limited to about 2 denier. As a result, only a partial improvement in the basic fabric as to the softness as well as neatness when folded can be obtained, which does not meet the above-mentioned various requirements for the basic fabric for an air bag. Furthermore, the yarns in these publications are obtained by a direct spinning method as disclosed therein. Such a direct spinning method is defective in that the finer the denier of the single filament, the more frequent the occurrence of naps and breakage of single filaments during a spinning process as well as a weaving process. In addition, the weaving process of a fabric for an industrial use such as a basic fabric for an air bag is usually done by using non-twisted yarns in a non-sized condition, which makes it easy for the yarns to generate naps as well as for the single filaments to break. Furthermore, in the case of an extremely fine yarn with a fineness of a single filament of 1.0 denier or less, even if no nap is generated in the yarns during the preceding spinning and winding process, the following weaving process may easily cause the yarns to produce naps and to break. As a result, it is considered that the prior art methods disclosed in the above-mentioned publications make it difficult to produce, in industry, a basic fabric for an air bag from the ultra-fine yarns with a denier of the single filament smaller than 0.8 (d), from the view points of reduced operational performance during the spinning process (a low spinnability) as well as weaving process (a low weavability).

Furthermore, Japanese Un-Examined Patent Publication No. 1-122752 discloses a method wherein a high density woven fabric is subjected to a shrinkage process, which is followed by a thermal fixing process and then by a calendering process, to obtain a basic fabric for an air bag with a high dimensional stability. However, since, in this prior art, the thread used in the prior art has a single filament denier of 1 (d) or more, the calendering process is insufficient to improve the softness to a desired level.

As a further prior art, Japanese Un-Examined No. 4-2835 discloses a non-coated type of basic fabric for an air bag made from a polyethylene terephthalate of low weight and a small thickness, which features that the air permeability is 0.5 cc/sec/cm$^2$ or less, the elongation at break is 650 psi or more, the tenacity is 300 lb or more, and the tearing strength of trapezoidal shaped test piece is 40 lb or more. In this prior art, the fineness of a single fiber is, at best, limited to about 1 denier, and the above-mentioned calendering process is essential for suppressing the gas permeability, so that the above-mentioned problems have remained unsolved.

In still further prior art, a use of ultra-fine fibers with a fineness of 1 denier or less has been proposed for use in clothes, as disclosed in Japanese Un-Examined Patent Publication No. 5-213131. However, the ultra-fine fibers used for the clothes in the prior art are produced using a polymer of an intrinsic viscosity of a value in a range between about 0.6 to 0.7, so that the tenacity of the yarn is as low as a value in a range between 2.5 to 4.5 g/denier, which makes it difficult to obtain an air bag of a desired strength. In view of this, it has also been proposed to combine the ultra-fine yarns with conventional yarn of a high tenacity and usual fineness, thereby preventing the tenacity from being lacked. Such a solution of combining the yarns causes, however, the advantage using the ultra-fine fibers, i.e., the high softness, to be lost.

As stated above, attempts have not been made in the prior art to produce and use an ultra-fine fiber using a 0.8 denier or less single filament, while maintaining a desired high tenacity.

As far as a use of ultra-fine fibers is concerned, Japanese Un-Examined Utility Model No. 56-56500 proposes to use such an ultra-fine fiber for an extendable fabric for a parachute. However, in this publication, the degree of the fineness of the single fiber is only mentioned, and no mention is made of the tenacity. In other words, nothing is mentioned in this prior art as to ultra-fine fibers capable of providing a high tenacity.

In short, there has been long felt a need, not yet realized, to produce a fiber construction for an industrial use, capable of providing a desired mechanical strength and softness, as well as a low air permeability, if it is needed, while suppressing the occurrence of naps as well as maintaining a desired quality.

SUMMARY OF THE INVENTION

An object of the present invention is to provide a fiber construction for use in industry, capable of overcoming the above-mentioned various difficulties in the prior art.

Another object of the present invention is to provide a fiber construction for use in a material for an industry, capable of providing a desired mechanical property as well as a desired degree of the softness, while reducing the number of naps and obtaining a reduced air permeability, if needed, in the case of a woven fabric as the fiber construction.

Still another object of the present invention is to provide a method of producing such a fiber construction, capable of reducing the number of naps and breakage of single fibers which occur during a process, to obtaining the fiber construction, including spinning or weaving.

In order to attain these objects, according to the present invention, a high-strength ultra-fine fiber construction is provided, formed as a high-strength multi-filament yarn, including ultra-fine filaments with the fineness of a single filament being less than 0.8 denier, the tenacity of the yarn being 6.5 g/d or more, and the elongation at a break being 15% or more.

In the high-strength ultra-fine fiber construction according to the present invention, the high-strength multi-filament yarn is made, preferably, from polyester fiber, and more preferably, from polyethylene terephthalate fiber with an intrinsic viscosity (IV) of 0.8 or more.

Furthermore, in the high-strength ultra-fine fiber construction according to the present invention, it is preferable that it is made from a polyamide fiber with a polymerization degree corresponding to a sulfuric acid relative viscosity ($\rho_{rn}$) of 3.0 or more.

The high-strength ultra-fine fiber construction according to the present invention can be produced by simultaneously extruding two components of polymers from a spineret so as to create conjugated filaments of an islands-in-sea-type or a divisional type cross-sectional shape and of a fineness of a single filament of 3.0 denier or more, creating a multi-filament yarn of number of filaments of 120 or less, forming a fabric from the multi-filament yarns under substantially non-twisted and non-sized conditions, and reducing the fineness of the single filament in the multi-filament yarns, constructing the fabric to 0.8 denier or less by removing the polymer constructing the sea portions in the cross-section of the filament in case of the islands-in-sea-type or by subjecting the filaments to a dividing treatment in case of the divisional type of conjugate fiber.

The most important feature of the present invention resides in that the filament constructing the fiber construction is formed as a high-strength ultra-fine fiber which is easily obtained by spinning of conjugate fibers which is followed by dissolving, or by spinning of conjugate fibers which is followed by dividing. As a result, a high quality of fiber construction of an increased mechanical performance as well as an increased softness is obtained, while reducing the number of naps as well as the generation of breakage of filaments. Furthermore, in the case of a woven fabric, a particular value of the number of picking of weft yarns per unit of length and/or warp yarns per unit of width is desirable in that the above-mentioned performances are maintained, while obtaining a reduced air permeability.

According to the present invention, the fiber construction, herein, refers to any object, of which a part or an entire part is constructed from fibrous material. The fibrous material, herein, refers to any such a material, which, when approximated to a circular cylindrical shape, has a ratio of its height to its diameter (below: aspect ratio) of 10 or more. Typical examples of such a fiber construction include a fabric such as a woven fabric, a knitted fabric and a non-woven fabric, and a strand such as a rope and a swing thread. In the fiber construction, the fibrous material can be under a continuous state or under a discontinuous state. Furthermore, in addition to the fabric and the rope, a combined structure thereof with coated or impregnated resin is within the scope of the fiber construction according to the present invention. Furthermore, the fiber construction may be three dimensional, including a structure made from a resin which is reinforced by a reinforcing material in its inner side or on its outer surface. In short, the high-strength ultra-fine fiber construction refers to a fiber construction wherein a high-strength ultra-fine fiber disclosed in this specification is used therein at least in part.

The fiber construction using the high-strength ultra-fine fibers according to the present invention can be used as various constructions of a limitless shape, including a one dimensional construction such as a rope; a two dimensional construction including a fabric such as a woven fabric, a knitted fabric and a non-woven fabric; a three dimensional construction including combined construction made from a resin to which a strengthening material made of a different resin is added. The fabric as the two dimensional construction is, however, preferable, since the ultra-fine fiber in this structure is the most effective to provide a desired softness, lightness and hand.

In the multi-filament yarn for constructing the high-strength ultra-fine fiber construction, it is essential that the fineness of the single filament constructing the multi-filament yarn is less than 0.8 denier.

When the fineness of the single filament constructing the multi-filament yarn is 0.8 denier or more, a desired improved softness cannot be obtained even if the total denier of the yarn is reduced. However, an excessively reduced fineness of the single filament requires an increased number of the filaments in the yarn in order to obtain a desired strength which is necessary for a material for an industrial use, which makes it necessary to combine a plurality of yarns after the conjugate spinning, which makes the system to be inapplicable for an actual industry, on one hand, and the quality to become to be poor. In view of this, a range of the fineness of the single filaments is, preferably, 0.1 denier or more and less than 0.8 denier, and more preferably 0.1 denier or more and 0.5 denier and less.

The multi-filament yarn for constructing the high-strength ultra-fine fiber construction according to the present invention must have a tenacity of 6.5 g/d or more, more preferably, of 7.5 g/d or more. This strength characteristic is essential in order to satisfy the usual requirements for the high-strength ultra-fine fiber construction. In other words, if the tenacity is lower than the above range, it is difficult to satisfy the mechanical strength which is required from the actual view point. Due to the fact that the high-strength ultra-fine fiber construction according to the present invention constructs the fiber construction, a desired mechanical performance is obtained without using yarns including increased fineness of a single filament.

Furthermore, it is necessary that the multi-filament yarn constructing the high-strength ultra-fine fiber construction according to the present invention has a value of the elongation at break which is 15% or more, and more preferably is 18% or more. A value of the elongation at break smaller than 15% causes the softness to become inferior, i.e., harder, and naps and filament breakage to be easily generated during a spinning or a weaving process. Contrary to this, the elongation at break which is excessively high causes the elongation of the fiber construction itself to be excessively large, thereby causing the dimensional and shape stability to be worsened. Thus, it is usually desirable that the value of the elongation at break is of 40% or less. In addition, in the case of a basic fabric for an air bag as the fiber construction according to the present invention, that the elongation at break should larger than 40% is not preferable from the view point of the restriction of the gas permeability.

It should be noted that the above values of the tenacity and the elongation at break are of the yarn as a constituent of the fiber construction and not the ones of the yarn just when it is produced, i.e., before the fiber construction is formed. In other words, the above ranges of the value of tenacity and the elongation are the one after the ultra-fine fiber is constructed not the ones before the sea component is removed or the conjugate fiber is divided. The sea component removing or dividing treatment to produce the ultra-fine fiber is, from the view point of efficiency, preferably done, after the formation of the fiber construction, by any suitable method, including a solvent treatment process or a dissolving process. During such a fiber fining treatment, the fiber is, itself, shrunk, so that a small increase in an elongation of the fiber is obtained before the ultra-fine fiber is actually obtained.

The multi-filament yarn for constructing the high-strength ultra-fine fiber construction according to the present invention is not limited to a particular type of polymer and, therefore, can be produced from various conventional types of polymers if the ultra-fine fiber can be made by the sea portion removing method or the dividing method. Namely, examples of these polymer are polyester, such as a polyethylene terephthalate, polybutylene terephthalate, and polyethylene naphthalate; a polyamide, such as polyhexamethylene adipamide, polytetramethylene adipamide and polycaproamide; polyolefine, such as polyacrylonitrile, polyvinyl alcohol, polyethylene and polypropylene; aromatic polyamide; and aromatic polyester.

It is possible that, in order to improve any desired characteristic, such as spinnability, the polymer used may include additional copolymer components or additives so long as the original characteristics are not worsened. Furthermore, in order to improve the performance of the fabric, it is possible to add additives such as anti-oxidants and pigments, so long as the spinnability is not worsened.

The yarn made from polyester or polyamide is preferable in view of the consideration of the easiness of the production of the ultra-fine fiber by means of the conjugate spinning as well as the dimensional stability and the mechanical characteristic of the fiber construction as obtained. In particular, a polyethylene terephthalate fiber including units of polyethylene terephthalate of weight of 85% or more is preferable.

In the case where the ultra-fine fiber is constructed as a polyethylene terephthalate fiber, a polymer of a higher viscosity causes it to be easy to obtain a desired strength as well as the elongation. Thus, it is desirable that the intrinsic viscosity of the finally obtained ultra-fine fiber is 0.8 or more. An intrinsic viscosity of the finally obtained ultra-fine fiber lower than 0.8 makes it difficult to obtain the desired strength, on one hand, and reduces the heat resistance as well as the dimensional stability, on the other hand.

Furthermore, in the high-strength ultra-fine fiber construction according to the present invention, when the ultra-fine fiber constructing the fiber construction is the polyethylene terephthalate fiber, it is preferable that a crystallite volume (C) measured by wide-angle X-ray diffraction is $8 \times 10^4$ Å$^3$ and/or a long period in the direction of the meridian (Dm) measured by small-angle X-ray diffraction is 120 Å or longer, and/or a crystallite orientation (Fc) measured by wide-angle X-ray diffraction is 0.90 or more. When the crystallite volume (C) is lower than $8 \times 10^4$ Å$^3$, or the long period (Dm) is shorter than 120 Å or the crystallite orientation (Fc) is smaller than 0.90, it becomes difficult to obtain a high-strength, on one hand, and the durability is apt to be reduced since hydrolysis easily occurs, on the other hand.

Furthermore, in the high-strength ultra-fine fiber construction, when the ultra-fine fiber constructing the fiber construction is polyethylene terephthalate fiber, it is preferable that the amorphous orientation (Fb) is 0.975 or more. When the amorphous orientation (Fb) is lower than 0.975, the dimensional stability and a heat resistance are reduced, which makes it difficult for the fiber construction to be used as an industrial material.

Furthermore, in the high-strength ultra-fine fiber construction according to the present invention, when an ultra-fine fiber constituting the fiber construction is manufactured from a polyamide such polyhexamethylene adipamide or polycaproamide, an increased degree of softness can be advantageously obtained because the characteristic small initial modulus intrinsic to such a polyamide fiber is combined with the softness per-se obtained by the ultra-fine fiber. In this case, when a polymer of a higher viscosity is used, it, also, easily provides the above-mentioned ranges of the tenacity and elongation, which makes it desirable to use a sulfuric acid relative viscosity ($\rho_{rn}$) of 3.0 or more.

In the high-strength ultra-fine fiber construction according to the present invention, the ultra-fine filament constructing the high-strength multi-filament yarn is entirely made from substantially the same polymer component, or from two or more polymer components.

When considering that the high-strength fiber is easily obtained and a spinning operation becomes easy, it is desirable that the ultra-fine filament constructing the high-strength multi-filament yarn has entirely and substantially the same polymer component. In order to obtain the ultra-fine filament constructing the high-strength multi-filament made entirely and substantially from a single polymer component, in addition to direct spinning, a conjugated spinning process including the islands-in-sea-type conjugate spinning and the dividing type conjugate spinning and a blend spinning process can be employed. In the conjugate spinning or blend spinning process, only a single kind of component is finally left in order to obtain the ultra-fine fiber. From the view point of the easiness of the production, it is desirable that the islands-in-sea-type conjugate spinning is employed, wherein, after the conjugate spinning, the yarn is subjected to the removing process of the sea portions, thereby obtaining the ultra-fine fiber. Such an islands-in-sea-type conjugate spinning is especially preferable in the situation that the total denier of the high-strength multi-filament yarn to be obtained is large, and the denier of the single filament of the ultra-fine fiber is small.

When the fiber construction is a fabric such as a woven or knitted fabric, and when the softness and touch of the fabric are important, it is desirable that the ultra-fine filament constructing the high-strength multi-filament yarn is made from two or more polymer components. In this case, it is important that the multi-filament yarn is mixed yarn made respectively from two or more different polymer components, which causes a repulsion force to be generated between the filaments of the different kind of polymers, which prevents the single filaments from being concentrated, which makes it easy for the single filaments to be separated from each other, thereby increasing the softness, on one hand, and improving a touch, on the other hand. Contrary to this, a woven fabric as the fiber construction may have a structure, where a first multi-filament yarn is constructed from a single polymer component, while, adjacent to the first yarn, a second ultra-fine filament yarn as a weft or a warp yarn is constructed from a single and different polymer component. This structure cannot obtain any improvement as to the filament separation due to the fact that no repulsion force is created in filaments in a yarn, so that an improvement in the softness can be rarely obtained.

For constructing the multi-filament yarn from mixed ultra-fine filaments made of two or more kinds of polymers, a method wherein two kinds of ultra-fine fibers produced separately are combined, and are subjected to a mixing or interlacing by using a flow of air or steam so that the filaments are collected for creating a multi-filament yarn, or a method wherein two or more kinds of polymers are simultaneously extruded from a spineret can, for example, be employed.

Among the above methods, the conjugate spinning method is preferable in that a uniformly mixed condition of the two kind of filaments of different polymer is obtained, thereby obtaining the maximum repulsion force between the different kinds of the filaments. In this case, in order to carry out the conjugate spinning, both of the islands-in-sea-type of conjugate spinning or the dividing type of conjugate spinning can be employed. However, in the case of the islands-in-sea-type conjugate spinning, a conjugate spinning including at least three components of different polymers is employed, since the polymer constructing the sea portion must be removed, which is apt to make it difficult to execute the spinning operation. In such a case, it is more preferable to employ the dividing type of conjugate spinning.

When a basic fabric for an air bag is considered, it becomes necessary to reduce the gas permeability to a low value while, in the case of the islands-in-sea-type conjugation spinning, where the portion corresponding to the sea is removed, spaces are apt to be generated, which may reduce the value of the air permeability. Thus, the dividing type conjugated spinning is more preferable to obtain the high-strength multi-filament yarns, where a dividing type conjugated filament from two or more kinds of polymers is first obtained and followed by a dividing process.

Furthermore, in case of the fabric as the fiber construction using the high-strength ultra-fine fiber according to the present invention, in order to make it possible to obtain an advantage of the softness, lightness and touch resulting from the ultra-fine fiber, it is desirable that the total denier of the multi-filament is 1000 (d) or less. When considered a desired strength level as for an industrial use, it is further desirable that the total denier is 100 (d) or more and 1000 (d) or less. When a fabric is made by a yarn of the total denier larger than 1000 (d), even if the single filament is the ultra-fine fiber of the fineness smaller than 0.8 (d), the thickness of the fabric is increased, thereby causing the softness to become insufficient.

The woven fabric as produced above can have improved characteristics that, depending on a weaving density, the tensile strength is 100 kg/3 cm (length of sample) or more, preferably, 150 kg/3 cm or more, and, more preferably, 170 kg/3 cm or more, and; a softness evaluation value by means of a cantilever method is 60 mm or less, more preferably 45 mm or less. When the tensile strength is smaller than 100 kg/3 cm, a case may arise that, as for the industrial use, the mechanical strength is too low. Furthermore, it is not desirable that the softness evaluation value is larger than 60 mm, because the softness increasing effect of the present invention is not provided.

The fabric using the high-strength ultra-fine fiber according to the present invention can be developed for various industrial uses. Among the others, due to the fact that the softness as well as a lightness are high and that a low gas permeability can be easily obtained by suitably designing the construction of the fabric, an application as a basic fabric for an air bag is preferable.

The various characteristics required of the basic fabric for an air bag include, in addition to mechanical characteristics such as tensile strength and tearing strength, softness, lightness, compactness (neatness when folded) and low gas permeability. In order to allow the basic fabric for an air bag to meet these requirements, it is desirable that the total denier of the high-strength ultra-fine multi-filament yarn is in a range between 180 to 450 (d). When the total denier is larger than 450 denier, an increased density of the fabric, which is enough to obtain a sufficiently low gas permeability without any coating of a resin, causes the thickness of the fabric to be excessively increased, thereby reducing the softness and lightness. Furthermore, the degree of the compactness is likely to be worsened when the air bag is to be stored. Contrary to this, when the total denier is smaller than 180 (d), the mechanical strength of the fabric is likely to be insufficient, even if the fabric is woven at a density as high as possible, which is not preferable, since the bag is apt to be broken when it is inflated. Thus, a more desirable range of the total denier is 200 (d) or more and 375 (d) or less.

As another variant of a multi-filament yarn for constructing a basic fabric for an air bag, which satisfies the above condition, is as follows. Namely, when the high-strength ultra-fine multi-filament yarn is woven into a fabric, a cover factor K of a fabric of 1,900 or more, more preferably 2,000 or more, makes it possible to obtain a desired characteristic of the basic fabric for the air bag even when uncoated. A cover factor K smaller than 1,900 makes the gas permeability too high in the uncoated condition, such that inflation becomes insufficient, on one hand, and a mechanical strength of the fabric is low, on the other hand, which makes the fabric unsuitable.

According to the present invention, the basic fabric for an air bag has improved characteristics when the tensile strength of the basic fabric is 100 kg/3 cm or more, the softness evaluation value by the cantilever method is 60 mm or less, and an amount of air passing through the fabric under a pressure drop of 1.27 cm is 5.0 $cm^3/sec/cm^2$ or less. In other words, the basic fabric for air bag according to the present invention can have a low gas permeability as well as an increased softness.

The fabric which satisfies the above conditions can have a tearing strength as high as 8 kgf or more and a burst strength of 40 $kg/cm^2$ or more when measured by the method stipulated in JIS (Japanese Industrial Standard)-L-1018A (Mullen method).

By using the high-strength ultra-fine fiber according to the present invention, i.e., by using the fiber as weft and warp yarns for constructing the basic fabric for an air bag, a high-strength ultra-fine fiber yarn which can be produced by conjugate spinning followed by dissolvingly removing process or from a conjugate spinning followed by a dividing process and which has particular values of a tenacity, total denier and single filament denier, a high quality of basic fabric for an air bag can be obtained, wherein, in addition to the improved mechanical properties, a low gas permeability as well as a small number of naps and filament breakage during the weaving process are obtained. It should be noted that the basic fabric for an air bag using the high-strength ultra-fine filament according to the present invention can be used as a non-coated type fabric where the fabric is used without any resin coating, although such a resin coating can, if necessary, be employed.

The high-strength ultra-fine fiber construction according to the present invention is constructed from a high-strength ultra-fine fiber obtained by using the conjugate spinning method including, as mentioned above, the islands-in-sea-type or the dividing type. In detail, such a high-strength ultra-fine fiber can be easily made by the following method.

In the case where the islands-in-sea-type is employed, conventional islands-in-sea-type conjugate spinning is initially executed, where two kinds of polymers are simultaneously extruded from a spineret, so as to obtain a multi-filament yarn in which the fineness of the conjugate single filament is 3.0 denier or more.

In this case, for the island portion, a polymer which finally constructs the fabric is used, while, for the sea portion, a polymer with a solubility in a particular solvent higher than that of the first polymer for constructing the island portion is used. It is necessary that the first polymer for constructing the island component must be a high-strength and a high elongation type, in order to allow the filament to have sufficient mechanical strength, which makes it preferable for the first polymer to have a high degree of polymerization. In particular, as mentioned previously, it is preferable that, in case of the polyethylene terephthalate, the intrinsic viscosity for the ultra-fine fiber is 0.8 or more, and, in case of the polyamide, that the sulfuric acid relative viscosity of the ultra-fine fiber is 3.0 or more. Therefore, as for a viscosity of a polymer as chips for use in the melt spinning, it is preferable that, in the case of the polyethylene terephthalate, the intrinsic viscosity is 1.0 or more, and, in the case of the polyhexamethylene adipamide, the sulfuric acid relative viscosity is 3.0 or more, in order to obtain the above-mentioned high-strength and large elongation characteristic.

When the ratio of the sea portion to be removed is reduced, the efficiency for producing the fiber is naturally increased. The reduction of the ratio of the sea component causes the density of the fabric to be increased, and the gas permeability to be reduced. In view of this, it is, generally, preferable that the ratio of the sea portion is as small as possible. Namely, the ratio of the sea portion is preferably 20% or less, and more preferably 10% or less. A low ratio of the sea portion may cause the island portions to connect with each other, which makes a smooth drawing of the conjugate filament, in particular drawing at a higher drawing ratio, becomes more difficult, and then, which makes it difficult to obtain a desired mechanical strength and elongation characteristic. Thus, it desirable that the ratio of the sea portion to the island portion is at least 5%.

During a conventional melt spinning process, the polymers of the island and sea portions form, in the spineret, a combined flow, which is, in a transverse cross-section, in an island-in-sea form, and is extruded from the spineret to create the multi-filament yarn. In order to prevent the polymers from being thermally degraded during the melt spinning, it is desirable that the total duration of the stay of the polymers in the spinning machine is as short as possible. Namely, the stay time is preferably shorter than 10 minutes, or more preferable in a range between 1 to 5 minutes.

When the two kinds of polymer are extruded from the spineret, the number of filaments of the conjugated yarn is 120 or below, and more preferably 20 or more and 90 or less. If the number of the filaments is larger than 120, the spacing between spinning holes in the spineret is reduced due to the limited are of the spineret, which may cause the filaments to contact each other after the extrusion of the filament, which makes it difficult to obtain a stable state of the spinning. In the conjugated fiber according to the present invention, due to the complicated cross sectional shape at the spineret, the polymers as extruded therefrom are likely to be bent, which makes it easy for the filaments to contact each other.

In the islands-in-sea-type conjugate spinning, the number of the conjugate filaments (number of the holes in the spineret) and the number of the islands in a single conjugate filament is determined in accordance with the total denier of the multi-filament yarn to be obtained from the spineret and the single filament denlet in the high-strength ultra-fine fiber construction. When the number of the filaments in the conjugate yarn is small, the number of the islands must be correspondingly increased, while the fineness of the single conjugate filament is increased, so that the cooling of the yarn is likely to be non-uniform, so that the stability of the spinning operation is worsened. Contrary to this, when the number of the filaments in the conjugate yarn is excessively large, the number of the islands in a single conjugate filament (a hole of the spineret) becomes small, which causes the denier of the single conjugate filament to become small. In this latter case, during cooling of the spun yarn, contact between the single filaments may occur, thereby generating naps and breakage of the filaments, which negate the advantages of using the conjugate yarn. A balanced determination should be done between the number of the filaments in the conjugate multi-filament yarn from a spineret and the number of the islands in a filament in such a manner that the denier of the conjugate filament after being subjected to the drawing process is in a range between 3 (d) to 10 (d).

It is preferable that a heating zone with a length of 10 to 100 cm is arranged just below the spineret, and is temperature controlled in a range between 200° C. to 350° C. The length and the temperature of the heating tube can be optimally determined in accordance with various spinning factors such as the characteristic of the two kinds of the polymers, the denier of the conjugate filament and the number of the conjugate filaments in a multi-filament yarn. The provision of the heating tube is effective for delaying the solidification of the melt polymer, which is effective for generating a high-strength. Furthermore, in order to prevent thermal degradation at a high temperature, the atmosphere in the heating tube may be sealed by means of a high temperature inert gas.

The yarn as melt spun is, after passing through the high temperature atmosphere area, subjected to cooling by a cooling air flow, then, to finishing so that a finishing agent is supplied to the yarn, and finally to winding by a take-up roll for controlling the spinning speed.

It is preferable that the un-drawn yarn taken up by the roller is, without being wound, subjected, directly, to a drawing process. However, it is also possible that the un-drawing yarn is, once, wound, and is then, subjected to a drawing process at a later separate stage. The spinning speed is usually 1500 m/min or less. The drawing process is done by usual thermal drawing, and a two stage drawing is preferable. A drawing ratio is optimally determined in dependence of the kind of the polymer as used as well as spinning speed. The drawing ratio is determined by various factors such as birefringence in an undrawn condition, the drawing temperature, and an allocation of drawing ratios when a multi stage drawing process is employed, and is usually 3.0 or more and preferably 3.0 to 6.5 and more preferably 4.0 to 6.0.

The conjugate yarn thus obtained by subjecting to the drawing process has a single filament denier of 3 (d) or more and preferably of 5 (d) or more. When the single filament denier is less than 3 (d), an unevenness in the fineness is likely generated due to the sway of the yarn in the heating tube during the spinning. Such an unevenness in the fineness makes it difficult to obtain a uniform state of drawing, on one hand, and naps and filament breakage are likely to be generated, which makes it difficult to produce the yarn having the desired properties, on the other hand.

Following drawing, the drawn yarn is subjected to a thermal set treatment. Such a thermal set treatment is done by a usual method wherein the yarn is contacted with a hot roller or hot plate, or the yarn is passed through a gas at a high temperature. By changing the tension as well as the temperature during the thermal set treatment, it is possible to control the value of the dry heat shrinkage. For example, when the fabric is such a type that requires a low air permeability, it is especially preferable that the dry heat shrinkage by the heat treatment of 150° C. and of 30 minutes is 1% or more and 10% or less, more preferably, 3% or more and 8% or less, since a suitable shrinkage of the fabric is obtained when the sea component is removed from the fabric, so that a low gas permeability is obtained after the removal of the sea component. A desired level of an actual shrinkage is determined in accordance with the warp and weft yarn density during weaving and the desired final air permeability and mechanical strength.

The high-strength ultra-fine fiber obtained by the island-in-sea-type conjugate spinning according to the present invention can be additionally subjected to a filament interlacing process during the drawing and heat set process. In order to effect the interlacing, a known method such as an air interlacing can be employed. For example, in the case of the air interlacing, an air pressure in accordance with the denier of the yarn and the tension is suitably changed in order to obtain a desired level of the interlacing. In this case, the degree of the interlacing is preferably 20 or more and more preferably 50 or more.

As a result of the drawing process, a conjugate multi-filament yarn with a single filament fineness of 3 to 8 denier, a tenacity of 7.0 g/d or more, preferably 8.0 g/d or more, and the elongation at break of 13.5% or more can be obtained.

In order to obtain the high-strength ultra-fine fiber construction by using the above-mentioned multi-filament yarn, a fiber construction is created by using the conjugate yarns. For example, in the case of a woven fabric as the fiber construction, the obtained conjugate filament yarns are used for weft and warp yarns, so that a conventional weaving process is carried out. The weaving is usually done with non-twisted and non-sizing conditions. However, twisting or sizing can be done when it is necessary. A suitable weaving construction such as a plain weave or twill can be selected to match the object. A weaving density is also suitably determined. In particular, in case of the basic fabric for an air bag, in order to obtain desired value of the cover factor K which determines the air permeability of the final woven fabric, the weaving density is determined while considering filament denier as well as a degree of the shrinkage which is determined by the amount of the sea component to be removed during the removing treatment and the heat applied during the removing treatment.

In the conjugate spinning method according to the present invention, in order to obtain a fiber construction constructed by the ultra-fine fiber of the single filament fineness of 0.8 d or less, a large denier filament yarn including single filaments of the fineness of 3.0 denier or more is at the first stage formed to the desired shape of the fiber construction, and then a process for obtaining the ultra-fine fiber is done. As a result, the generation of filament breakage as well naps during the spinning process as well as naps and filament breakage during the formation of the fiber construction can be avoided which would otherwise occur if a yarn of such a fineness is produced from the beginning of the spinning process and is used for producing the fabric. Namely, the use of the large denier filament yarn including single filaments of the fineness of 3.0 denier or more for the weaving according to the present invention can eliminate any necessity of sizing as well as twisting, while carrying out an effective weaving operation, on one hand, and obtaining a fabric of an increased softness and lightness.

Thus produced woven fabric as the fiber construction is, then, subjected to a treatment for removing the sea components so that the filaments constructing the fabric become ultra-fine fibers. The treatment for removing the sea components is, depending from the characteristic of the polymer in the sea component, selected from dissolving by water, decomposition by various solution such as an acid solution or an alkali solution, or dissolution by an organic solvent. Furthermore, as disclosed in the Japanese Un-Examined Patent Publication No. 56-118961, prior to the removing treatment, a preliminary treatment for making the polymer to be removed brittle is possible.

These treatments can be done under the condition of heating or pressurizing so long as the characteristic of the island components which construct the fiber construction is not deteriorated. When it is necessary to limit the air permeability as is the case for the basic fabric for the air bag, it is desirable that the space occupied by the sea components prior to the removing treatment is simultaneously reduced by shrinkage of the fabric. In view of this, it is desirable that the removal of the sea components are done by passing the solvent while being heated. Furthermore, heating to 70° C. or more is preferable for making shrinkage take place.

The polymer for use as the sea component can be any conventional polymer. For example, as for a type capable of being dissolved by a solvent, polystyrene can be used. As for a type capable of being dissolved by water or decomposable by an aqueous solution, a polyester copolymerized with 5 sodium isophthalic acid can be used. Furthermore, another type of water soluble polymer can be used. As an example of a polymer capable of eluting by a water, a Japanese Un-Examined Patent Publication No. 4-361659 discloses a water soluble polyester, including, as a main acid component, a terephthalic acid, including 5-sodium-sulfo-isophthalic acid of 8 to 16 mol % and isophthalic acid of 5 to 40 mol %, and, as a main diol component, ethylene glycol, including a copolymerized poly-ethylene glycol of molecular weight of 5000 or less, which ratio of the copolymerization is 10 weight % or less. Such a polymer capable of eluting by a water is more preferable from the view point that damage to the island components during the removing process is reduced.

In the fiber construction thus obtained after the sea portion removing treatment, the multi-filament yarn is only constructed from a high-strength ultra-fine fiber with a single filament fineness of 0.8 denier or less, a tenacity of 6.5 g/d or more, and the elongation at break of the multi-filament yarn being 15% or more.

When the method of a conjugate spinning of islands-in-sea-type is employed, even if the degree of the elongation of the yarn obtained at the conjugate spinning process is as low as about 13%, the following sea component removing treatment at the time of the fiber construction causes the elongation of the filament constructed thereof to be increased so as to attain the degree of the elongation of a value of 15% or more.

From the view point of obtaining stable the islands-in-sea-type conjugate spinning for producing the high-strength ultra-fine fiber, it is preferable that the island component finally constructing the ultra-fine fiber is a filament yarn constructed from a single kind of polymer. It is, however, possible to construct the island component from two or more kinds of polymers by using the spineret as disclosed in Japanese Examined Patent Publication No. 58-4086. When the island component is constructed of two or more kinds of polymers, it is possible to obtain a construction that single filaments which are adjacent with each other are made from the different polymers, which allows a repulsion force to be generated therebetween, which is advantageous in obtaining an increased softness and touch.

In the case where there exist ultra-fine fibers of two kinds of polymers in the multi-filament yarn, it is preferable that the ratio between the two polymers for constructing the ultra-fine fibers is in a range between 3:7 to 7:3, thereby maintaining the respective characteristic of the polymers.

In the fiber construction according to the present invention, it is necessary to harmonize the total denier of the ultra-fine fiber and the single filament denier in accordance with the fiber construction to be made. In the case where the island-in-sea-type conjugate spinning method is employed, it is possible, from the construction of the spineret, that the number of the ultra-fine filaments (number of islands) obtained from a conjugate yarn is larger than the divided number obtained by the divisional type conjugate spinning. Namely, in the divisional type conjugate spinning, there exists a limit in the number of the divisions when the single conjugate filament denier is reduced. Namely, due to the existence of a limitation on the number of the divisions in the divisional type conjugate spinning, the denlet of a single conjugate filament should be reduced in order to obtain the desired fineness after dividing treatment. Such a reduction in the denier of the single conjugate filament causes the stability of the spinning operation to be worsened. In short, the islands-in-sea-type conjugate spinning method is preferable over the divisional type conjugate spinning in a point to execute stable spinning, while obtaining ultra-fine fiber as desired.

On the other hand, the high-strength ultra-fine fiber construction according to the present invention can also be obtained from the high-strength ultra-fine fiber obtained from the divisional type of conjugate spinning. The divisional type conjugate spinning can be executed by the same spinning machine for executing the islands-in-sea-type conjugate spinning by merely using a different construction of a spineret as well as different kind of a polymer over those in the islands-in-sea-type conjugate spinning. Namely, two or more kinds of polymers are simultaneously extruded from the spineret to obtain a conjugate yarn, which is then subjected to a drawing process for obtaining a conjugate yarn of an increased strength. As similar to the islands-in-sea-type conjugate spinning, a heating tube of a length of 10 to 100 cm and of a temperature controlled to 200° C. to 350° C. is arranged just below the spineret. Furthermore, the yarn is subjected to a drawing of a drawing ratio of 3.0 or more, and preferably 3.0 to 6.5, and more preferably 4.0 to 6.0, which makes it easy to obtain an increased strength.

As a result, a multi-filament yarn is obtained after the drawing of a single filament with a fineness of 3.0 to 8.0 denier, a tenacity of 7.0 g/d or more, more preferably, 8.0 g/d, and an elongation at break of 13.5% or more.

Then, a fiber construction is produced from the yarns, which is followed by the divisional treatment to the conjugate yarn to obtain the ultra-fine fiber in the fiber construction. Such a division to the divided ultra-fine fiber can employ any conventional method, including a treatment by a solvent. Namely, such a solvent is used to partially remove the polymers constructing the fiber construction, so that gaps are created or division is occurred, or is used to swell the particular polymer for causing it to be skewed, thereby generating division.

Any combination of polymers can be used in the divisional type conjugate spinning if the combination allows the polymers to be simultaneously melt spun. However, in order to obtain an increased strength, it is necessary that the polymer is a type with a high degree of polymerization and that drawing of the yarn under the conjugate state is possible. From these points of view, a preferable combination is, for example, chips of a polyethylene terephthalate with an intrinsic viscosity of 1.0 or more and chips of a polyhexamethylene adipamide with a sulfuric acid relative viscosity of 3.0 or more.

In this divisional type conjugate spinning it is not necessary that all of the part of one of the polymers is removed. In other words, a mixed filament yarn may be constructed by ultra-fine filaments of two or more kinds of polymers, which makes the spinning to be more productive. The divisional type is also advantageous in that a low air permeability is easily obtained.

Finally, the fiber construction according to the present invention is possibly subjected to a heat set process so long as the characteristics according to the present invention are substantially not worsened.

EXAMPLES

Now, examples of the present invention will be explained in detail.

The various properties in the present invention are measured as follows.

a. Intrinsic Viscosity (IV) of Polyester

By using Ostwald viscometer, a relative viscosity $\rho_{rp}$ of a solution, to 25 ml of ortho-chlorophenol, of a sample of 2 gram is measured at the temperature of 25° C., and the intrinsic viscosity (IV) is calculated by the following approximated equation.

$IV = 0.0242 \rho_{rp} + 0.2634$, where, $$\eta_{rp} = \frac{t \times d}{t_0 \times d_0},$$

and t: time for drop of the solution (sec)
$t_0$: time for drop of ortho-chlorophenoll (sec)
d: density of the solution (g/cc), and
$d_0$: density of the ortho-chlorophenoll (g/cc)

b. Sulfuric Acid Relative Viscosity ($\rho_m$) of Polyamide

A sample of 1 wt % is dissolved in a 98% sulfuric acid, and the relative viscosity is measured by the Ostwald viscometer under the temperature of 25° C.

c. Tenacity and Elongation at Break of Conjugate Yarn

Measurement was done under a method stipulated by JIS-L-1017.

d. Tenacity and Elongation at Break of Ultra-Fine Fiber

The measurement is done by removing the yarn from the fiber construction. Namely, in case of the woven fabric, yarn samples are disassembled from the fabric. In case of knitted fabric or non-woven fabric, filaments as samples are taken out therefrom while preventing the yarn from being damaged.

The disassembled filaments are cut to a length of 25 cm and, while applying a load which corresponds to the denier of the filament as obtained by the spinning, multiplied by ⅓. Then, the weight of the sample of the above length is measured, from which the denier of the dismantled fiber as a weight of a length of 9000 m is calculated. Then, by using tensile tester of model RTM-100 produced by Orientic corporation, a tensile test is executed on the sample length of 15 cm, at a speed of 30 mm/min, and the strength of the maximum strength point is read out. The tenacity is calculated from the strength as read out divided by the denier of the dismantled filament, and an average value of five samples is calculated.

e. Crystallite Volume (C) of Fiber

A wide angle X-ray generating device produced by Rigaku Denki K. K. was used. As for a X-ray source, CuKα with an Ni filter was used, under conditions of output power of 35 KV and 15 mA, and of slit size of 2 mm(Φ). The camera condition is such that the direction of the equator (2θ) is 10° to 35° in steps of 0.05°, the direction of meridian (2θ) is 10° to 35° in steps of 0.05°, and a direction of the circumference (2θ) is 90° to 270° for steps of 0.5°. The measurement is done for an accumulated time of 2 seconds.

The preparation of the samples for measurement was done as follows.

The conjugate yarns are cut to a length of 20 cm, and 10 to 20 are collected in a parallel condition. The yarns are then wrapped in gauze to prevent the yarns from being separated. Then, the island removing treatment or dividing treatment is done to obtain ultra-fine fibers while preventing the yarns from being folded or crimped.

The crystallite size is calculated from a peak width at half height of plane orders (010), (100) and (−105), respectively, obtained by a transmission method by using the following Scherrer equation, $$L(hkl) = \frac{K\lambda}{\beta_0} \cos \theta_B,$$

where L(hkl): the size in a direction transverse to the (hkl) plane of the crystallite,
K: 1.0
λ: wavelength of X-ray
$\beta_0$: $(\beta_E^2 - \beta_1^2)^{1/2}$
$\beta_E$: peak width at half height as observed (measured value)
$\beta_1$: $1.05 \times 10^{-2}$ rad.
$\beta_B$: Bragg angle Using the value L as obtained by the above equation, a crystallite volume (C) is calculated by the following equation.

$$C = L_{(010)} \times L_{(100)} \times L_{(-105)} \; (\text{Å}^3)$$

f. Long Period in Meridian Direction (Dm) of Fiber

A small angle X-ray generating device (model RU200) produced by Rigaku Denki K. K. was used. As a X-ray source, CuKα with an Ni filter was used under conditions of output power of 50 KV and 200 mA, and of slit width of 1 mm(Φ). The camera condition is such that a radius of the camera was 400 mm, Kodak DEF-5 films were used, and the exposure time was 120 minutes.

From a distance (r) on the small angle X-ray scattering photograph, the long period (J) can be calculated by the following Bragg equation.

$J=(\lambda/2) \sin((\tan^{-1}(r/R))$
R: camera radius
λ: wavelength of X-ray
J: long period The high-strength ultra-fine fiber according to the present invention provides a scattering pattern at 4 spots of laminer shape. Thus, from the distance between the scattered points corresponding to the axis of the fiber, a long period Dm (Å) can be calculated by a definition as explained in "KOBUN-SHI NO X-SEN (X-ray for High Polymer)", part 2, section 5, by L. E. Alex-Ander, translated by Hamada and Kajii in supervision by Sakurada, published by Kagaku Dojin (publisher), 1973.

g. Crystallite Orientation (Fc) of Fiber

From a peak width H° at the half height of the strength distribution curve along a Debye ring in an equator line interference at the (010) plane obtained by wide angle X-ray measurement the crystallite orientation Fc can be calculated by the following equation.

$Fc=(180°-H°)/180°$ h. Amorphous Orientation (Fb) of Fiber

A polarization fluorescence method was employed. A model FOM-1 devices produced by Nippon Bunko Kogyo K. K., was used, while employing a transmission light method, where the exciter light wavelength was 365 nm, and the fluorescence wavelength was 420 nm. The result was expressed by a mean value of 5 samples.

The samples of ultra-fine fibers or normal fibers obtained as explained in the section (e) were, under non-folded and non-crimped condition, immersed in a solution including fluorescing agent at about 0.2% at 55° C. for 4 hours and then washed with water and air-dried to obtain a sample to be tested.

i. Tensile Strength of Fabric

In accordance with JIS (Japanese Industrial Standard)-K-6328 (strip method), a measurement was done on a 3 cm sample. The results are expressed as a mean value of the measured values in directions of warp and weft.

j. Tearing Strength of Fabric

The measurement is done in accordance with JIS-L-1096 (trapezoid method). The results are expressed as a mean value of the measured values in directions of warp and weft.

k. Softness of Fabric

The result is expressed by a degree of softness and stiffness measured in accordance with JIS-L-1096 (45 degree cantilever method).

l. Permeability of Fabric

This is expressed by the amount of air passing through a fabric when the pressure drop across the fabric is 1.27 cm of water. This measurement is done in accordance with the A-method in JIS-L-1096. The result (amount of passed air) is expressed in units of $cm^3/sec/cm^2$.

m. Degree of Ease of Making Yarn

The degree of ease of operation during treatments for producing the fiber construction according to the present invention is relatively expressed as the number of naps and fiber breaks generated.

n. Cover Factor

The cover factor K of a fabric was calculated by the following equation.

$$K=N_W \times D_W^{1/2}+N_F \times D_F^{1/2},$$

where $N_W$ is the warp density (number of warp yarns per one inch), $D_W$ is the weft density (number of weft yarns per one inch), $N_F$ is the denier of the warp yarn, and $D_F$ is the denier of the weft yarn.

EXAMPLE 1

A polyethylene terephthalate (PET) of an intrinsic viscosity (IV) of 1.20 as an island component and a polyethylene terephthalate copolymerized with 5.0 mol % of 5-sodium-sulfo-isophthalic acid (Co-PET), of an intrinsic viscosity (IV) of 0.70 as a sea component are employed. These two polisher components are subjected to a two component conjugate melt spinning by a usual islands-in-sea method. The number of holes in the spineret was 60. The number of islands in a single conjugate filament was 16. The ratio between island and sea was 91 (island)/9 (sea). The spinning temperature was 290° C. A heating tube of length 300 mm at a temperature of 320° C. was arranged just below the spineret. The spinning speed was 600 m/min.

The thus melt spun yarns were, without being wound, continuously directed to a two stage drawing, where drawing in a heated condition is done at a total drawing ratio of 5.5 and a temperature of 215° C. at the final drawing roll, and then to a relaxing process at a relax ratio of 3.0%, so that a conjugate filament yarn of the islands-in-sea-type of a total denier of 335 (d) and of number of filaments of 60 were obtained. Stable spinning as well as drawing can be done without generating a remarkable number of filament breakages or naps.

In the obtained filament yarn, the fineness of a single filament as a conjugate filament was 5.58 denier, the tenacity was 8.6 g/d, and the elongation was 14.8%. The sea component of the yarn was dyed by a cation dye and then the cross section of the yarn was observed by a scanning electron microscope. As a result of the observation, it was confirmed that a high quality of the islands-in-sea construction was created.

Then, by using the filament yarns as weft and warp yarns, a fabric of a plain weave construction was woven under a warp density of 62 warp yarns per one inch and a weft density of 61 weft yarns per one inch. Although the weaving was done under non-sizing condition and non-twisted condition, naps and filament breakages were not generated during the weaving process.

Then, the woven fabric was treated, under a relaxed state, in a boiling water solution of 1% of sulfuric acid for 60 minutes. The fabric was then passed through a water solution of sodium hydroxide at a temperature 90° C., thereby removing the sea component (polyethylene terephthalate copolymerized with 5-sodium-sulfo-isophthalic acid).

The fabric was then subjected to the usual drying and thermal set treatments.

The filament constructing the fabric is one in which the original conjugate filament is reduced in fineness. The yarn dismantled from the fabric had a total denier of 310 (d), a number of filaments equal to 960 (=60 (number of holes)×16 (number of islands)), a single filament denier of 0.32 (d), a tenacity of 7.6 g/d, and an elongation at break of 19.5%.

The weaving density after the heat set treatment was 63 warp yarns per one inch and 61 weft yarns per one inch, and the cover factor of the fabric was 2183.

EXAMPLE 2

As in the Example 1, changing the amount of total extrusion from that in the first embodiment and subjecting air-interlacing before winding, a drawn conjugate multi-filament yarn, of the islands-in-sea-type, of a total denier of 235 (d) and of 60 filaments was obtained. The island/sea ratio was 90 (island)/10 (sea).

The properties of the obtained filament were such that a single filament denier was 3.92 (d), the tenacity was 8.5 g/d, and the elongation at break was 16.7%, and the degree of the interlacing was 60. By using the yarns as weft and warp yarns, a fabric of a plain weave was woven with a weaving density of 71 warp yarns per one inch and 70 weft yarns per one inch. The weaving was carried out under non-sizing and non-twisting conditions, and nap and filament breakage did not occur.

As in the Example 1, the fabric was treated, under a relaxed condition, in a boiled water solution of 1% sulfic acid, and was then passed to a water solution of sodium hydroxide at a temperature of 80° C., thereby removing the sea components. The fabric was then subjected to the usual drying and heat set treatments.

The filament constructing the fabric is the one which can be obtained by reducing the fineness of the conjugate fiber. In the yarn dismantled from the fabric, the total denier was 222 (d), the number of filaments was 960, the single filament denier was 0.23, the tenacity was 7.4 g/d, and the elongation at break was 20.0%.

The weaving density of the fabric after the heat set treatment was 73 warp yarns per inch and 72 weft yarns per inch. The cover factor of the fabric was 2160.

EXAMPLE 3

As in Example 1, using a spineret having 90 holes and 12 islands in a single conjugate filament and changing the amount of total extrusion from that in the Example 1, a drawn conjugate multi-filament yarn of the islands-in-sea-type with a total denier of 855 (d) and containing 90 filaments was obtained. The island/sea ratio was 87 (island) /13 (sea).

The properties of the obtained filament was such that a single filament denier was 9.50 (d), the tenacity was 8.9 g/d, and the elongation at break was 16.5%.

Using the yarns as weft and warp yarns, a fabric of a plain weave was woven with a weaving density of 28 warp yarns per one inch and 28 weft yarns per one inch. The weaving was carried out under non-sizing and non-twisting conditions, and nap and filament breakage did not occur.

As in Example 1, the fabric was treated, under a relaxed condition, in a boiling water solution of 1% sulfic acid, and then was passed to a water solution of sodium hydroxide at a temperature of 80° C., to thereby remove the sea components. The fabric was subjected to the usual drying and heat set treatments.

The filament constructing the fabric is one which can be obtained by reducing the fineness of the conjugate fiber. In the yarn dismantled from the fabric, the total denier was 774 (d), the number of filaments was 1080, the single filament denier was 0.73, the tenacity was 7.4 g/d, and the elongation at break was 21.2%.

The weaving density of the fabric after the heat set treatment was 30 warp yarns per inch and 29 weft yarns per inch. The cover factor of the fabric was 1641.

EXAMPLE 4

In place of the polyethylene terephthalate in Example 1, a polyhexamethylene adipamide (N66) with a sulfuric acid relative viscosity ($\rho_m$) of 3.2 was used as the island component, and the polyethylene terephthalate copolymerized with 5-sodium-sulfo-isophthalic acid of 5.0 mol % and of an intrinsic viscosity (IV) of 0.70 was used as the sea component. The number of holes in the spineret was 60. The number of islands in a single conjugate filament was 16. A ratio between island and sea was 90 (island)/10 (sea). The temperature of the melt was 290° C. A heating tube of length 300 mm at a temperature of 320° C. was arranged just below the spineret. The spinning speed was 700 m/min.

The thus melt spun yarns are, without being wound, continuously directed to a two stage drawing device, where drawing, in a heated condition, is done at a total drawing ratio of 5.0 and a temperature of 215° C. at the final drawing roll, and then to a relaxing process at a relax ratio of 3.0% and then subjecting air-interlacing, so that a conjugate filament yarn, of the islands-in-sea-type, with a total denier of 345 (d) and with 60 filaments and with a degree of the interlacing of 50 was obtained. A stable spinning process as well as drawing can be done without generating a remarkable number of filament breakages or naps.

In the obtained filament yarn, the fineness of the conjugate single filament was 5.75 denier, the tenacity was 8.8 g/d, and the elongation was 21.5%. The sea component of the yarn was dyed by a cation dye and the cross section of the yarn was observed by a scanning electron microscope. As a result of the observation, it was confirmed that a high quality islands-in-sea construction was created.

Then, using the filament yarns as weft and warp yarns, a fabric of a plain weave was woven with a warp density of 60 warp yarns per one inch and a weft density of 59 weft yarns per one inch. Although the weaving was done under non-sizing condition and non-twisted condition of the yarns, naps and filament breakage were not generated during the spinning process.

Then, the woven fabric was, under a relaxed state, passed through a water solution of sodium hydroxide at a temperature 95° C., thereby removing the sea component (polyethylene terephthalate copolymerized with 5-sodium-sulfo-isophthalic acid).

The fabric was then subjected to the usual drying and thermal set treatments.

The filament constructing the fabric is one in which the original conjugate filament is reduced in fineness. The yarn dismantled from the fabric was of total denier of 330 (d), the number of filaments was 960, a single filament denier was 0.34 (d), the tenacity was 8.2 g/d, and the elongation at break was 24.5%.

The weaving density after the heat set treatment was 62 warp yarns per one inch and 61 weft yarns per one inch, and the cover factor of the fabric was 2234.

EXAMPLE 5

As a spineret, a three component conjugate spinning spineret of the same construction as disclosed in Japanese Examined Patent Publication No. 57-49653 was used. A polyethylene terephthalate of an intrinsic viscosity (IV) of 1.20 as a first island component, a polyhexamethylene adipamide of a relative viscosity $\rho_m$ of 3.2 as a second island component, and a copolymerized polyester of a mixture of terephthalic acid (70%) and isophthalic acid (30%), at a 87.5 mol %, with 5-sodium-sulfo-isophthalic acid at 12.5 mol % as a sea component, were employed. These three kinds of polymer components were subjected to a conjugate spinning and were wound at a winding speed of 500 m/min. In this case, in each hole of the spineret, the number of the first islands was 34, and the number of the second islands was 36. The number of the holes, i.e., the conjugate filaments was 16. The ratio between island and sea was 90 (island)/10 (sea). In this case, the calculated ratio between the polyester fiber and polyamide fiber was 49:51.

The multi-filament yarn as obtained, by using a hot plate, was subjected to a drawing process at a drawing ratio of 5.6, so that a drawn yarn of total denier of 350 (d) and of a number of filaments of 16 (70 L) was obtained. The properties of the yarn were such that the tenacity was 7.4 g/d and the elongation at break was 16.5%.

Then, by using the drawn yarn as warp and weft yarns, a fabric of plain weave structure was obtained with a warp density of 60 warp yarns per one inch and 59 weft yarns per one inch.

Then, as in Example 1, the fabric is, under a relaxed state, treated in a boiling water solution of 1% of sulfuric acid, and then, the fabric is passed through a water solution of a sodium hydroxide of a temperature 90° C., thereby removing the sea components (copolymerized polyester of mixture of terephthalic acid and isophthalic acid with 5-sodium-sulfo-isophthalic acid).

The fabric was then subjected to conventional drying and heat set treatments.

The fabric was then subjected to a drying in a hot air dryer at a temperature of 80° C.

A small piece was cut from the fabric, and is dyed by an acid dye by using a conventional method. Then, the cross-section of fabric was observed using a scanning electron microscope. As a result of the observation, it was found that the sea portion was completely removed, while many ultra-fine filaments were in a collected state. Furthermore, it was found that a randomly arranged condition is obtained between the polyester component (polyethylene terephthalate) and the polyamide component (polyhexamethylene adipamide).

The yarn dismantled from the fabric had total denier of 323 (d), 1120 filaments, a single filament denier of 0.29 (d), a tenacity of 7.1 g/d, and an elongation at break of 18.5%.

The weaving density after the heat set treatment was 62 warp yarns per one inch and 61 weft yarns per one inch, and the cover factor of the fabric was 2211.

EXAMPLE 6

By using a 16-division type spineret of a similar construction to that disclosed in Japanese Examined Patent Publication No. 47-2485, and by employing as polymers a polyethylene terephthalate of an intrinsic viscosity (IV) of 1.20 and a polyhexamethylene adipamide of a relative viscosity $\rho_m$ of 3.2, as in the above Example 5, divisional type conjugate spinning was done at a spinning speed of 800 m/min, so that a multi-filament yarn was obtained, having conjugate filaments each constructed of the polyethylene terephthalate component and the polyhexamethylene adipamide component connected at their contacting interface area. The yarn is, then, subjected to a drawing process of a drawing ratio of 4.2 using a conventional hot plate drawing. The number of the filaments in the yarn was 32. The drawn yarn is of a total denier of 250 (d) and of a number of filament of 32. The tenacity was 7.9 g/d, and the elongation at break was 18.7%.

By using the drawn yarn as warp and weft yarns, a fabric of a plain weave construction was woven with a warp density of 72 warp yarns per one inch and 71 weft yarns per one inch.

Then, as disclosed in Japanese Un-Examined Patent Publication No. 61-669, the fabric was immersed in a solution of ethylene glycol including 20% of benzyl alcohol at a temperature of 40° C. for 8 minutes, so that a division into filaments occurred at the interfaces between the polyethylene terephthalate and the polyhexamethylene adipamide.

Then, the fabric was subjected to conventional drying and heat set treatments.

Then, the fabric was subjected to a drying in a hot air dryer at a temperature of 80° C.

The yarn dismantled from the fabric was of total denier of 258 (d), the number of filaments was 512 (=32 (number of holes of spineret)×16 (number of division of each hole)), a single filament denier was 0.50 (d), the tenacity was 7.1 g/d, and the elongation at break was 19.7%.

The weaving density after the heat set treatment was 74 warp yarns per one inch and 72 weft yarns per one inch, and the cover factor of the fabric was 2345.

Comparative Example 1

As in the Example 1, by using a polyethylene terephthalate of an intrinsic viscosity (IV) of 1.20 as an island component and a polyethylene terephthalate copolymerized with 5.0% of 5-sodium-sulfo-isophthalic acid of an intrinsic viscosity (IV) of 0.70 as a sea component, two component conjugate melt spinning was done by using a conventional islands-in-sea-type conjugation spinning. The number of holes in the spineret was 60. The number of islands in a single hole (conjugate filament) was 6. The ratio between island and sea was 91 (island)/9 (sea). The spinning temperature was 290° C. A heating tube of length 300 mm of temperature of 320° C. was arranged just below the spineret. The spinning speed was 600 m/min.

The thus melt spun yarns are, without being wound, continuously directed to a two stage drawing, where drawing under heated condition is done at a total drawing ratio of 5.5 and a temperature of 215° C. at the final drawing roll, and then to a relaxing process at a relax ratio of 3.0%, so that an islands-in-sea-type conjugate filament yarn of a total denier of 340 (d) and 60 filaments was obtained. A stable spinning as well as drawing could be done without generating a remarkable number of filament breakages or naps.

In the obtained filament yarn, the fineness of a single filament of a conjugate filament was 5.67 denier, the tenacity was 8.6 g/d, and the elongation was 17.5%.

Then, by using the filament yarns as weft and warp yarns, a fabric of a plain weave was woven with a warp density of 57 warp yarns per one inch and a weft density of 56 weft yarns per one inch. Although the weaving was done under a non-sizing condition and a non-twisted condition of the yarns, naps and filament breakage were not generated during the waving process.

Then, the removal of the sea component was done in the same way as that in the Example 1. Then, the fabric was subjected to the usual drying and thermal set treatments.

The filament constructing the fabric is one in which the original conjugate filament is reduced in fineness. The yarn dismantled from the fabric had a total denier of 320 (d), 360 (=60 (number of hole)×6 (number of islands)) filaments, a single filament denier of 0.89 (d), a tenacity of 7.6 g/d, and an elongation at break of 19.4%.

The weaving density after the heat set treatment was 58 warp yarns per one inch and 57 weft yarns per one inch, and the cover factor of the fabric was 2058.

Comparative Example 2

Except that the intrinsic viscosity (IV) of 0.70 of the chips of polyethylene terephthalate was used, the islands-in-seatype conjugate spinning as the same to the Example 1 was done. The number of holes in the spineret was 60. The number of islands in a single hole (conjugate filament) was 16. The ratio between island and sea was 91 (island)/9 (sea). The spinning temperature was 280° C. No heating tube was used. The spinning speed was 600 m/min.

Then, the melt spun yarns were, without being wound, continuously directed to a one stage drawing device with a drawing ratio of 3.3, and then to a relaxing process at a relax ratio of 3.0%, so that a conjugate filament yarn of the islands-in-sea-type of a total denier of 235 (d) and with 60 filaments was obtained. A stable spinning as well as drawing can be done without generating a remarkable number of filament breakages or naps.

In the obtained filament yarn, the fineness of a single filament as a conjugate fiber was 3.92 denier, the tenacity was 3.9 g/d, and the elongation was 24.0%. The sea component of the yarn was dyed by a cation dye and the cross section of the yarn was observed using a scanning electron microscope. As a result of the observation, it was confirmed that a high quality islands-in-sea construction was created.

Then, by using the filament yarns as weft and warp yarns, a fabric of a plain weave construction was woven with a warp density of 71 warp yarns per one inch and a weft density of 70 weft yarns per one inch. Although the weaving was done under non-sizing condition and non-twisted condition, naps and filament breakage were not generated during the weaving process.

Then, the woven fabric was passed, under a relaxed state, through a boiling water solution of sulfuric acid. Then, the fabric is passed through a water solution of a sodium hydroxide of a temperature 80° C., thereby removing the sea component (polyethylene terephthalate copolymerized with 5-sodium-sulfo-isophthalic acid). Then, the fabric was subjected to the usual drying and thermal set treatments.

The filament constructing the fabric is one in which the original conjugate filament is reduced in fineness. The yarn dismantled from the fabric had of total denier of 222 (d), 960 filaments, a single filament denier of 0.23 (d), a tenacity of 3.4 g/d, and an elongation at break of 27.2%.

The weaving density after the heat set treatment was 73 warp yarns per one inch and 73 weft yarns per one inch, and the cover factor of the fabric was 2175.

Comparative Example 3

A fabric was woven as in Comparative Test 2 but the weaving density was changed to 52 warp yarns and 52 weft yarns.

The weaving density after the heat set treatment was 53 warp yarns per one inch and 53 weft yarns per one inch, and the cover factor of the fabric was 1579.

Comparative Example 4

By using chips of polyethylene terephthalate of an intrinsic viscosity (IV) of 1.20, and by using a spineret having 60 holes, melt spinning was done using a usual direct spinning method. The spinning temperature was 300° C. A heating tube of length 300 mm at a temperature of 300° C. was arranged just below the spineret. The spinning speed was 500 m/min. The thus melt spun yarns are, without being wound, continuously directed to a drawing process where drawing under a heated condition is done at a total drawing ratio of 5.9 and a temperature of 220° C. at the final drawing roll, and then to a relaxing process at a relax ratio of 3.0%, while being subjected to an air interlacing treatment, so that a drawn yarn of a total denier of 420 (d) and 60 filaments was obtained.

In this case, a stable spinning as well as drawing can be done without generating a remarkable number of filament breakage or naps.

In the wound filament yarn, the fineness of a single filament was 7.00 denier, the tenacity was 9.5 g/d, and the elongation was 17.2%.

Then, by using the filament yarns as weft and warp yarns, a fabric of a plain weave was woven with a warp density of 54 warp yarns per one inch and a weft density of 54 weft yarns per one inch. Although the weaving was done under non-sizing condition and non-twisted condition of the yarns, naps and filament breakage were not generated during the weaving process.

The weaving density after the heat set treatment was 56 warp yarns per one inch and 55 weft yarns per one inch, and the cover factor of the fabric was 2275.

Comparative Example 5

By using chips of polyethylene terephthalate of an intrinsic viscosity (IV) of 1.20, and by using a spineret having 240 holes, melt spinning was done using a usual direct melt spinning method. The spinning temperature was 300° C. A heating tube of length 300 mm at a temperature of 300° C. was arranged just below the spineret. The spinning speed was 600 m/min. The thus spun yarns were, without being wound, continuously directed to a drawing process, where drawing under a heated condition is done at a total drawing ratio of 5.4 and at a temperature of 220° C. at the final drawing roll, and then to a relaxing process at a relax ratio of 3.0% while being subjected to an interlacing treatment by air flow, so that a drawn yarn of a total denier of 420 (d) and of number of filaments of 288 was obtained.

In this case, due to a sway of the yarn in the heating tube, contact between filaments occurred, causing filament breakages to be frequently generated during the drawing process.

In the wound filament yarn, the fineness of a single filament was 1.46 denier, the tenacity was 8.6 g/d, and the elongation was 15.2%. A weaving under the same condition as specified in the Example 1 were tried. However, a stable operation was impossible due to the frequent occurrence of naps.

Comparative Example 6

As in Example 1, by increasing the extrusion amount and setting the drawing ratio to a value of 6.1, a conjugate multi-filament yarn of a total denier of 335 (d), with 60 filaments, a single filament denier of 5.58 (d) as a conjugate filament, a tenacity of 10.2 g/d, and an elongation at break of 10.5% was obtained. A small number of naps were generated during the spinning.

Then, by using the filament yarns as weft and warp yarns, a fabric of a plain weave was woven with a warp density of 62 warp yarns per one inch and a weft density of 61 weft yarns per one inch. The weaving under non-sizing and non-twisted conditions caused a large number of naps to be generated during the waving process.

Then, the woven fabric was treated, under a relaxed state, in a boiled water solution of 1% of a sulfuric acid for 60 minutes. Then, the fabric was passed through a water solution of sodium hydroxide of a temperature 90° C., thereby removing the sea component (polyester copolymerized with 5-sodium-sulfo-isophthalic acid).

Then, the fabric was subjected to the usual drying and thermal set treatments.

The filament constructing the fabric is one in which the original conjugate filament is reduced in fineness. The yarn dismantled from the fabric had a total denier of 310 (d), 960 filaments, a single filament denier of 0.32 (d), a tenacity of 9.1 g/d, and an elongation at break of 12.1%.

The weaving density after the heat set treatment was 63 warp yarns per one inch and 61 weft yarns per one inch, and a cover factor of the fabric as calculated was 2183. However, the quality of the fabric was poor due to the occurrence of naps.

Comparative Example 7

As in Example 6, by using an 8-division type spineret of a similar construction to that disclosed in Japanese Examined Patent Publication No. 47-2485, and by employing as polymers polyethylene terephthalate of an intrinsic viscosity (IV) of 1.20 and the polyhexamethylene adipamide of a relative viscosity $\rho_m$ of 3.2, as in the above Example 5, a divisional type conjugate yarn with 120 filaments and of total denier of 220 (d) was obtained. In this case, the spinning was done at a spinning speed of 800 m/min, which is followed by a conventional drawing process, using a hot plate, with a drawing ratio of 4.2.

The fineness of the conjugate single filament was 1.83 denier. Due to the extreme fineness of the conjugate filament, the large sway generated during the spinning process causes the filament to break and naps to be frequently generated.

The following Table I shows various characteristic of the yarns as obtained by the Examples 1 to 6 and the Comparative Examples 1 to 7, while Table II shows various characteristic of the fabrics and operating characteristics during the weaving process.

TABLE I

| No. | Spinning Method | Constituent Polymer ||||  Properties of as Conjugate Yarn |||||
|---|---|---|---|---|---|---|---|---|---|---|---|
| | | Island Component || Sea Component || Total Denier (d) | Number of Filaments | Single Filament Denier (d) | Number of Islands | Tenacity (g/d) | Elongation at Break (%) |
| | | Kind of Polymer | Viscostiy | Kind of Polymer | Viscostiy | | | | | | |
| Example 1 | Islands-In-Sea Type Including One Island Component | PET | 1.20 | Co-PET | 0.70 | 335 | 60 | 5.58 | 16 | 8.6 | 14.8 |
| Example 2 | Islands-In-Sea Type Including One Island Component | PET | 1.20 | Co-PET | 0.70 | 235 | 60 | 3.92 | 16 | 8.5 | 16.7 |
| Example 3 | Islands-In-Sea Type Including One Island Component | PET | 1.20 | Co-PET | 0.70 | 855 | 90 | 9.50 | 12 | 8.9 | 16.5 |
| Example 4 | Islands-In-Sea Type Including One Island Component | N66 | 3.2 | Co-PET | 0.70 | 345 | 60 | 5.75 | 16 | 8.8 | 21.5 |
| Example 5 | Islands-In-Sea Type Including Two Island Components | PET N66 | 1.20 3.2 | Co-PET | | 350 | 60 | 5.83 | 16 | 7.4 | 16.5 |
| Example 6 | Divisional Type Including Two Components | PET N66 | 1.20 3.2 | — | | 250 | 32 | 7.81 | 16 (Number of Divisions) | 7.9 | 18.7 |
| Comparative Example 1 | Islands-In-Sea Type Including One Island Component | PET | 1.20 | Co-PET | 0.70 | 340 | 60 | 5.67 | 6 | 8.6 | 17.5 |
| Comparative Example 2 | Islands-In-Sea Type Including One Island Component | PET | 0.70 | Co-PET | 0.70 | 235 | 60 | 3.92 | 16 | 3.9 | 24.0 |
| Comparative Example 3 | Islands-In-Sea Type Including One Island Component | PET | 0.70 | Co-PET | 0.70 | 235 | 60 | 3.92 | 16 | 3.9 | 24.0 |
| Comparative Example 4 | Direct Spinning | PET | 1.20 | — | | 420 | 60 | 7.00 | — | 9.5 | 17.2 |
| Comparative Example 5 | Direct Spinning | PET | 1.20 | — | | 420 | 288 | 1.46 | — | 8.6 | 15.2 |
| Comparative Example 6 | Islands-In-Sea Type Including One Island Component | PET | 1.20 | Co-PET | 0.70 | 335 | 60 | 5.58 | 16 | 10.2 | 10.5 |
| Comparative | Divisional | PET | 1.20 | — | | 220 | 120 | 1.83 | 8 | 7.4 | 18.2 |

TABLE I-continued

| | | | | | | | |
|---|---|---|---|---|---|---|---|
| ative Example 7 | Type | N66 | 3.2 | | | (Number of Divisions) | |

| | | Properties of Yarn After Removal or Devision | | | | |
|---|---|---|---|---|---|---|
| | No. | Total Denier (d) | Number of Filaments | Single Filament Denier (d) | Tenacity (g/d) | Elongation at Break (%) |
| | Example 1 | 310 | 960 | 0.32 | 7.6 | 19.5 |
| | Example 2 | 222 | 960 | 0.23 | 7.4 | 20.0 |
| | Example 3 | 774 | 1080 | 0.72 | 7.4 | 21.2 |
| | Example 4 | 330 | 960 | 0.34 | 8.2 | 24.5 |
| | Example 5 | 323 | 1120 | 0.29 | 7.1 | 18.5 |
| | Example 6 | 258 | 512 | 0.50 | 7.1 | 19.7 |
| | Comparative Example 1 | 320 | 360 | 0.89 | 7.6 | 19.4 |
| | Comparative Example 2 | 222 | 960 | 0.28 | 3.4 | 27.2 |
| | Comparative Example 3 | 222 | 960 | 0.28 | 3.4 | 27.2 |
| | Comparative Example 4 | — | — | — | — | — |
| | Comparative Example 5 | — | — | — | — | — |
| | Comparative Example 6 | 310 | 960 | 0.32 | 9.1 | 12.1 |
| | Comparative Example 7 | — | — | — | — | — |

TABLE II

| | Properties of Fabric | | | | | |
|---|---|---|---|---|---|---|
| | Cover Factor | Thickness (mm) | Tensile Strength (kg/3 cm) | Softness (mm) | Air Permeability (cm³/sec/cm²) | Operational Easiness |
| Example 1 | 2183 | 0.23 | 160 | 46 | 0.7 | good |
| Example 2 | 2160 | 0.18 | 110 | 32 | 0.8 | good |
| Example 3 | 1641 | 0.34 | 285 | 50 | 6.1 | good |
| Example 4 | 2234 | 0.22 | 170 | 39 | 0.9 | good |
| Example 5 | 2211 | 0.24 | 145 | 32 | 0.6 | good |
| Example 6 | 2345 | 0.25 | 135 | 33 | 0.4 | good |
| Comparative Example 1 | 2038 | 0.25 | 160 | 85 | 0.7 | good |
| Comparative Example 2 | 2175 | 0.22 | 85 | 31 | 0.8 | good |
| Comparative Example 3 | 1579 | 0.22 | 65 | 30 | 11.2 | good |
| Comparative Example 4 | 2275 | 0.29 | 230 | 130 | 0.4 | good |
| Comparative Example 5 | Non-Weavable | — | — | — | — | bad |
| Comparative Example 6 | 2183 | 0.22 | 180 | 45 | 0.8 | bad |
| Comparative Example 7 | (Many breaks and Naps: Non-Weavable) | — | — | — | bad |

As shown in Table I and II, according to the present invention (Examples 1 to 6), the fiber construction can provide improved properties of mechanical strength, softness, as well as allowing the yarns to pass the weaving process without generating deficiencies such as naps and filament breakage. Furthermore, in the Examples 1 and 2, and 4 to 6, where the weaving density is increased to obtain the cover factor of 1900 or more, in addition to the improvement of the mechanical strength, softness and an operational improvement in the weaving, it is also possible to obtain a low gas permeability, which makes the fiber construction qualities to be suitably balanced for use as a basic fabric for an air bag.

Contrary to this, as far as the Comparative Example 1 is concerned, after reducing the fineness of the single filament by the removing process, the single filament denier is still excessively large, resulting in a reduction in softness.

In the Comparative Example 2, the strength is low not only in the state of the conjugate yarn but also in the state after the removal or divisional process for obtaining the ultra-fine fiber. Thus, in comparison with the Example 2 according to the present invention, the mechanical property is worsened, which makes the obtained fiber construction unsuitable for industrial use. An increased mechanical strength using such a yarn can be obtained if the total denier is increased by combining a plurality of yarns or if the weaving density is highly increased. However, such a solution necessarily and inevitably causes the softness to be worsened.

In the Comparative Example 3, the weaving density is further reduced over the Comparative Example 2, and therefore the mechanical properties are further worsened.

In the Comparative Example 4, the finally obtained single filament denier is as large as 7.0 (d), which causes the softness to be worsened.

In the Comparative Example 5, a yarn with a single filament denier as low as 1.46 (d) is produced by the direct spinning method, thereby producing a large number of filament breaks and naps. In other words, the yarn cannot be spun without generating operational difficulties.

In the Comparative Example 6, the drawing ratio is excessively increased during the melt spinning process, which causes the elongation of the yarn to be reduced, which causes naps to be generated often during the weaving process, which makes the operational quality poor.

In the Comparative Example 7, the number of divisions in a single conjugate filament is small, which make the denier of the single conjugate filament be small, thereby generating a large number of filament breaks and naps during spinning, thereby reducing the operational qualities.

The following Table III indicates, as to the Examples 1 and 3, and the Comparative Example 2, the crystallite volume V, a long period (Dm) in the meridian direction, a crystallite orientation (Fc), and an amorphous orientation (Fb).

TABLE III

| | Crystallite Volume (C) ($\times 10^4$) Å | Long Period in Meridian Direction Å | Crystallite Volume (Fc) | Amorphous Orientation (Fb) |
|---|---|---|---|---|
| Example 1 | 12.2 | 150 | 0.926 | 0.985 |
| Example 3 | 12.5 | 151 | 0.928 | 0.987 |
| Comparative Example 2 | 5.7 | 99 | 0.868 | 0.972 |

As will be clear from the Table III, according to the present invention, improved values are obtained as to all of the crystallite volume (V), the long period (Dm) in the meridian direction, the crystallite orientation (Fc), and the amorphous orientation (Fb). This result shows, from the X-ray micro structure view point, that the fiber construction according to the present invention is improved in view of the mechanical strength as well as a durability.

Contrary to this, in the Comparative Example 2, any of the listed properties is lower than those in the values of Examples 1 and 3 in the present invention, which can testify that the construction is not suitable for industrial use.

In short, the ultra-fine fiber construction formed from a high-strength multi-filament yarn according to the present invention is constructed from ultra-fine filaments of a single filament denier in particular range of values and an increased strength of a value in a particular range of values, which allows the fiber construction to provide desired mechanical properties, which allows the ultra-fine fibers to fully display their designated functions. A fabric as the fiber construction can attain all of the required characteristics such as an increased mechanical strength, a high softness, an increased neatness when folded, as well as a low air permeability. Furthermore, the method for producing the ultra-fine fiber construction according to the present invention can suppress any occurrence of naps and fiber breakage during a melt spinning process as well as a process for formation of the fiber construction. In other words, such a product can be produced without generating any operational problems, which otherwise may lower the productivity.

We claim:

1. An air bag comprising a high-strength ultra-fine fiber construction including a high-strength multi-filament yarn including ultra-fine filaments with a fineness of a single filament of 0.1 denier or more and less than 0.8 denier, a tenacity of the multi-filament yarn being 6.5 g/d or more, and an elongation at break of the multi-filament yarn being 18% or more.

2. The air bag according to claim 1, wherein said high-strength multi-filament yarn includes polyester fibers.

3. The air bag according to claim 2, wherein said polyester fibers include polyethylene terephthalate fibers of intrinsic viscosity (IV) of 1.0 or more.

4. The air bag according to claim 1, wherein said high-strength multi-filament yarn includes polyamide fibers with a sulfuric acid relative viscosity ($\rho_m$) of 3.0 or more.

5. The air bag according to claim 1, wherein all of the ultra-fine filaments constructing the high-strength multi-filament yarns are constructed from substantially the identical polymer composition.

6. The air bag according to claim 1, wherein said high-strength multi-filament yarn includes ultra-fine filaments obtained by a removing treatment on a sea portion in an islands-in-sea-type conjugate fiber.

7. The air bag according to claim 1, wherein the high-strength multi-filament yarn is a mixed yarn including filaments of different kinds of polymers.

8. The air bag according to claim 7, wherein the mixed yarn includes ultra-fine mixed filaments obtained by a division of divided type of conjugate fiber.

9. The air bag according to claim 1, wherein said fiber construction is a fabric.

10. A high-strength ultra-fine fiber construction including a high-strength multi-filament yarn including ultra-fine filaments with a fineness of a single filament of less than 0.8 denier, a tenacity of the multi-filament yarn being 6.5 g/d or more, and an elongation at break of the multi-filament yarn being 15% or more, wherein said high-strength multifilament yarn includes polyester fibers, said polyester fibers including polyethylene terephthalate fibers of intrinsic viscosity of 0.8 or more, and wherein said polyester fibers have a crystallite volume (C) with a value of $8\times10^4$ Å$^3$ or more.

11. A high-strength ultra-fine fiber construction including a high-strength multi-filament yarn including ultra-fine filaments with a fineness of a single filament of less than 0.8 denier, a tenacity of the multi-filament yarn being 6.5 g/d or more, and an elongation at break of the multi-filament yarn being 15% or more, wherein said high-strength multifilament yarn includes polyester fibers, said polyester fibers including polyethylene terephthalate fibers of intrinsic viscosity of 0.8 or more, and wherein said polyester fibers have a long period in a meridian direction with a value of 120 Å or more.

12. A high-strength ultra-fine fiber construction including a high-strength multi-filament yarn including ultra-fine filaments with a fineness of a single filament of less than 0.8 denier, a tenacity of the multi-filament yarn being 6.5 g/d or more, and an elongation at break of the multi-filament yarn being 15% or more, wherein said high-strength multifilament yarn includes polyester fibers, said polyester fibers including polyethylene terephthalate fibers of intrinsic viscosity of 0.8 or more, and wherein said polyester fibers have a crystallite orientation (Fc) with a value of 0.90 or more.

13. A high-strength ultra-fine fiber construction including a high-strength multi-filament yarn including ultra-fine filaments with a fineness of a single filament of less than 0.8 denier, a tenacity of the multi-filament yarn being 6.5 g/d or more, and an elongation at break of the multi-filament yarn being 15% or more, wherein said high-strength multifilament yarn includes polyester fibers, said polyester fibers including polyethylene terephthalate fibers of intrinsic viscosity of 0.8 or more, and wherein said polyester fibers have an amorphous orientation (Fb) with a value of 0.975 or more.

* * * * *